United States Patent
Chin (10) Patent No.: US 8,625,506 B2
(45) Date of Patent: Jan. 7, 2014

(54) SYSTEM AND METHOD FOR DETERMINING ESTABLISHMENT CAUSES

(75) Inventor: Chen Ho Chin, Deerlijk (BE)

(73) Assignee: BlackBerry Limited, Waterloo (CA)

( * ) Notice: Subject to any disclaimer, the term of this patent is extended or adjusted under 35 U.S.C. 154(b) by 379 days.

(21) Appl. No.: 12/688,578

(22) Filed: Jan. 15, 2010

(65) Prior Publication Data

US 2010/0182971 A1    Jul. 22, 2010

Related U.S. Application Data

(60) Provisional application No. 61/144,992, filed on Jan. 15, 2009, provisional application No. 61/147,396, filed on Jan. 26, 2009.

(51) Int. Cl.
     *H04W 4/00*      (2009.01)

(52) U.S. Cl.
     USPC ......................................... 370/329

(58) Field of Classification Search
     USPC ......................................... 370/329
     See application file for complete search history.

(56) References Cited

U.S. PATENT DOCUMENTS

| | | | |
|---|---|---|---|
| 2005/0090224 A1 | 4/2005 | Dorsey et al. | |
| 2008/0039109 A1* | 2/2008 | Cave | 455/450 |
| 2009/0238143 A1* | 9/2009 | Mukherjee et al. | 370/331 |
| 2010/0165940 A1* | 7/2010 | Watfa et al. | 370/329 |
| 2010/0172301 A1* | 7/2010 | Watfa et al. | 370/328 |
| 2010/0255808 A1 | 10/2010 | Guo et al. | |
| 2010/0265884 A1* | 10/2010 | Vikberg et al. | 370/328 |

FOREIGN PATENT DOCUMENTS

| | | |
|---|---|---|
| WO | 2008084316 | 7/2008 |
| WO | 2008084316 A1 | 7/2008 |
| WO | 2009082936 | 7/2009 |
| WO | 2009/117588 | 9/2009 |
| WO | 2011/039636 | 7/2011 |

OTHER PUBLICATIONS

3GPP TS 24.301 V8.0.0; Dec. 2008; 3GPP;V8.*
PCT International Search Report; PCT Application No. PCT/CA2010/000060; Mar. 29, 2010; 3 pgs.
PCT Written Opinion of the International Searching Authority; PCT Application No. PCT/CA2010/000060; Mar. 29, 2010; 4 pgs.
3GPP TS 23.060 V8.3.0; 3rd Generation Partnership Project; Technical Specification Group Services and System Aspects; General Packet Radio Service (GPRS); Service Description; Stage 2; Release 8; Dec. 2008; 271 pgs.
3GPP TS 23.272 V8.2.0; 3rd Generation Partnership Project; Technical Specification Group Services and System Aspects; Circuit Switched Fallback in Evolved Packet System; Stage 2; Release 8; Dec. 2008; 46 pgs.

(Continued)

*Primary Examiner* — Mark Rinehart
*Assistant Examiner* — Christopher R Crompton
(74) *Attorney, Agent, or Firm* — The Danamraj Law Group, P.C.

(57) ABSTRACT

A user agent (UA), core network (CN) device, and method for a circuit switched (CS) fallback service in an evolved packet system (EPS). In one embodiment, the UA or CN includes a protocol layer having a non-access stratum (NAS). A processor of the UA or CN is configured to promote the NAS to process an EXTENDED SERVICE REQUEST having a service type with a decode value. The decode value identifies an EPS-defined radio resource control (RRC) establishment cause (EC).

24 Claims, 4 Drawing Sheets

(56) References Cited

OTHER PUBLICATIONS

3GPP TS 23.401 V8.4.1; 3rd Generation Partnership Project; Technical Specification Group Services and System Aspects; General Packet Radio Service (GPRS) Enhancements for Evolved Universal Terrestrial Radio Access Network (E-UTRAN) Access; Release 8; Dec. 2008; 219 pgs.
3GPP TS 24.008 V8.4.0; 3rd Generation Partnership Project; Technical Specification Group Core Network and Terminals; Mobile Radio Interface Layer 3 Specification; Core Network Protocols; Stage 3; Release 8; Dec. 2008; 571 pgs.
3GPP TS 24.301 V8.0.0; 3rd Generation Partnership Project; Technical Specification Group Core Network and Terminals; Non-Access-Stratum (NAS) Protocol for Evolved Packet System (EPS); Stage 3; Release 8; Dec. 2008; 221 pgs.
3GPP TS 25.331 V6.20.0; 3rd Generation Partnership Project; Technical Specification Group Radio Access Network; Radio Resource Control (RRC); Protocol Specification; Release 6; Dec. 2008; 1251 pgs.
3GPP TS 36.331 V8.4.0; 3rd Generation Partnership Project; Technical Specification Group Radio Access Network; Evolved Universal Terrestrial Radio Access (E-UTRA) Radio Resource Control (RRC); Protocol Specification; Release 8; Dec. 2008; 198 pgs.
3GPP TSG CT WG1 Meeting #54; TSG RAN WG2; Title: Reply LS on S1 Overload Control and on Security for Service Request Message; C1-082250; Zagreb, Croatia; Jun. 23-27, 2008; 2 pgs.
3GPP TSG CT WG1 Meeting #55bis; Samsung; Title: P-CR on 24.301: Provision of RRC Establishment Cause Values by EPS NAS; C1-083834; Phoenix, Arizona (USA); Oct. 6-10, 2008; 2 pgs.
EPO, Communication Pursuant to Rules 161(1) and 162 EPC, Application No. 10777096.8, May 9, 2012, 2 pgs.
PCT, Search Report, Application No. PCT/CA2010/000060, Mar. 29, 2010, 3 pgs.
PCT, Written Opinion, Application No. PCT/CA2010/000060, Mar. 29, 2010, 4 pgs.
PCT, Search Report, Application No. PCT/IB2010/002607, Mar. 23, 2011, 6 pgs.
PCT, International Preliminary Report on Patentability and Written Opinion, Application No. PCT/IB2010/002607, Apr. 12, 2012, 11 pgs.
3GPP, TS 23.167, V9.2.0., Technical Specification Group Services and System Aspects; IP Multimedia Subsystem Emergency Sessions, Release 9, Sep. 28, 2009, pp. 1-38.
3GPP, TR 23.869, V9.0.0, Support for Internet Protocol based IP Multimedia Subsystem Emergency Calls over General Packet Radio Service and Evolved Packet Service, Release 9, Mar. 13, 2009, pp. 1-35.
3GPP, TS 24.008, V8.4.0, Technical Group Core Network and Terminals, Mobile radio interface Layer 3 specification, Core network protocols, Stage 3, Release 8, Dec. 2008, 574 pgs.
3GPP, TS 24.301,V9.1.0, Technical Specification Group Core Network and Terminals; Non-Access-Stratum protocol for Evolved Packet System, Stage 3, Release 9, Sep. 1, 2009, pp. 1-8.
3GPP, TS 36.331, V8.4.0, Technical Specification Group Radio Access Network, Evolved Universal Terrestrial Radio Access Radio Resource Control, Protocol specification, Release 8, Dec. 2008, 200 pgs.
Ericsson et al, "Verification of UE setting of the RRC Establishment Cause", 3GPP Draft, R5-093155, Verification of UE Setting of RRC Establishment Cause (Discussion), Jun. 23, 2009, 5 pgs.
Huawei et al, "RRC establishment cause for Emergency Service", 3GPP Draft, (C1-094752), Oct. 12, 2009, 4 pgs.
Hong Kong IPD, Gazette and Register Entry of Publication, Application No. 13101639.0, Jun. 7, 2013, 4 pgs.
IP India, Patent Application Publication, Application No. 5395/CHENP/2011 A, Nov. 23, 2012, 1 pg.
JPO, Notice of Reasons for Rejection, Application No. 2012-531517, Jun. 14, 2013, 4 pgs.
KIPO, Office Action, Application No. 10-2011-7018882, Mar. 25, 2013, 7 pgs.
3GPP TS 23.203 V8.4.0, Technical Specification Group Core Network and Terminals; Non-Access-Stratum (NAS) protocol for Evolved Packet System (EPS); Stage 3 (Release 9), Dec. 1, 2008, 111 pgs.
3GPP TS 24.301 V8.0.0, Technical Specification Group Core Network and Terminals; Non-Access-Stratum (NAS) protocol for Evolved Packet System (EPS); Stage 3 (Release 8), Dec. 1, 2008, 221 pgs.
3GPP TS 24.301 V9.0.0, Technical Specification Group Core Network and Terminals, Non-Access Stratum (NAS) Protocol for Evolved Packet System (EPS), Stage 3 (Release 9), Sep. 28, 2009, pp. 65, 66, 164-166, 264, 265.
3GPP TS 36.331 V9.0.0, Technical Specification Group Radio Access Network, Evolved Universal Terrestrial Radio Access (E-UTRA) Radio Resource Control (RRC), Protocol Specification (Release 9), Sep. 29, 2009, pp. 97, 98.
3GPP TSG CT WG1 Meeting #59, Vodafone, Including Call Type "Emergency Calls," Jun. 28, 2009, C1-092349, 2 pgs.
JPO, Notice of Reasons for Rejection, Application No. 2011-545601, Jan. 29, 2013, 4 pgs.
CIPO, Office Action, Application No. 2,749,713, Sep. 27, 2013, 2 pgs.
IP Australia, Patent Examination Report No. 1, Application No. 2010302349, Sep. 20, 2013, 3 pgs.
KIPO, Notice of Allowance, Application No. 10-2011-7018882, Aug. 26, 2013, 3 pgs.
SIPO, First Office Action, Application No. 201080012049.9, Aug. 27, 2013, 4 pgs.

\* cited by examiner

| Telephony service for which CS fallback is initaited | RRC establishment cause to use |
|---|---|
| Service request procedure triggered by CS fallback to initiate CS mobile originating call | MO signalling        or as an alternative method "MO data" |
| Service request procedure triggered by CS fallback to receive a CS mobile terminating call | "MO signalling"        or as an alternative method "MT access"        or as an alternatve method "MO data" |
| Service request procedure triggered by CS fallback to initiate CS mobile originating emergency call | "Emergency call" |

SYSTEM AND METHOD FOR DETERMINING ESTABLISHMENT CAUSES

CROSS-REFERENCE TO RELATED APPLICATIONS

The present application claims priority to U.S. provisional patent application No. 61/144,992, filed Jan. 15, 2009, by Chen-Ho Chin entitled "Determining RRC Establishment Causes of EPS NAS Procedures", and U.S. provisional patent application No. 61/147,396, filed Jan. 26, 2009, by Chen-Ho Chin entitled "System and Method for Determining Establishment Causes" which are incorporated by reference herein as if reproduced in their entirety.

BACKGROUND

As used herein, the terms "user agent" and "UA" might in some cases refer to mobile devices such as mobile telephones, personal digital assistants, handheld or laptop computers, and similar devices that have telecommunications capabilities. Such a UA might consist of a UA and its associated removable memory module, such as but not limited to a Universal Integrated Circuit Card (UICC) that includes a Subscriber identity Module (SIM) application, a Universal Subscriber Identity Module (USIM) application, or a Removable User Identity Module (R-UIM) application. Alternatively, such a UA might consist of the device itself without such a module. In other cases, the term "UA" might refer to devices that have similar capabilities but that are not transportable, such as desktop computers, set-top boxes, or network appliances. The term "UA" can also refer to any hardware or software component that can terminate a communication session for a user. Also, the terms "user agent," "UA," "user equipment," "UE," "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an enhanced node B (eNB), a wireless access point, or a similar component rather than a traditional base station. As used herein, the term "access node" will refer to any component of the wireless network, such as a traditional base station, a wireless access point, or an LTE eNB, that creates a geographical area of reception and transmission coverage allowing a UA or a relay node to access other components in a telecommunications system. In this document, the term "access node" may comprise a plurality of hardware and software.

An LTE system can include protocols such as a Radio Resource Control (RRC) protocol, which is responsible for the assignment, configuration, and release of radio resources between a UA and an access node or relay node or other LTE equipment. The RRC protocol is described in detail in the Third Generation Partnership Project (3GPP) Technical Specification (TS) 36.331. According to the RRC protocol, the two basic RRC modes for a UA are defined as "idle mode" and "connected mode." During the connected mode or state, the UA may exchange signals with the network and perform other related operations, while during the idle mode or state, the UA may shut down at least some of its connected mode operations. Idle and connected mode behaviors are described in detail in 3GPP TS 36.304 and TS 36.331.

The signals that carry data between UAs, relay nodes, and access nodes can have frequency, time, and coding parameters and other characteristics that might be specified by a network node. A connection between any of these elements that has a specific set of such characteristics can be referred to as a resource. The terms "resource," "communications connection," "channel," and "communications link" might be used synonymously herein. A network node typically establishes a different resource for each UA or other network node with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used herein, the following acronyms have the following definitions.

"AS" is defined as "access stratum," which is a layer in a protocol stack in a user agent (UA), radio access network (RAN).

"CN" is defined as "core network," which refers to devices and software for processing messages and data from user agents (UAs) sent through radio access networks (RANs).

"CS" is defined as "circuit switched," which refers to a conventional procedure for communicating a phone call or for connecting devices for data transfer over a permanent or semi-permanent radio connection, such as, for example, a telephony line.

"CS fallback" refers to a procedure in which, when implementing a communication, an evolved packet system (EPS) enabled device "falls back" to a circuit switched (CS) communication procedure.

"EC" is defined as "establishment cause," which refers to data that informs intervening protocol layers as well as devices and software in a radio access network (RAN) as to the "cause" or "reason" why a communication is to be established.

"eNB" is defined as "enhanced node B," which is an example of one type of device used in a radio access network (RAN) to aid in establishing communication between a UA and a CN.

"EPC" is defined as "evolved packet core," which refers to the core network (CN) to which a long term evolution (LTE) radio network communicates.

"EPS" is defined as "evolved packet system," which refers to the EPC and a set of access systems—EPS represents the system that may have the LTE as a radio network, and the EPC as its core network.

"E-UTRAN," is defined as "evolved UTRAN," which refers to "evolved UMTS terrestrial RAN," which in turn refers to, "evolved universal mobile telecommunications system terrestrial radio access network;" E-UTRAN refers to the network of "e-NBs" ("enhanced node-Bs") and radio network controllers in an a long term evolution (LTE) communications system.

"LTE" is defined as "long term evolution," which refers to a newer system of high speed mobile communications and infrastructure.

"NAS" is defined as "non-access stratum," which is a layer in a protocol stack in both a UA and a core network (CN), but may not be in a protocol stack of a radio access network (RAN).

"MAC" is defined as "medium access control," which is a protocol layer in a UA, RAN, and CN.

"MO data" is defined as "mobile originating data," which is a type of establishment cause used in EPS-enabled systems.

"MO signaling" is defined as "mobile originating signaling," which is a type of establishment cause used in EPS-enabled systems.

"MT access" is defined as "mobile terminating access," which is a type of establishment cause used in EPS-enabled systems.

"RAN" is defined as "radio access network," which refers to a network of switching nodes between a UA and a CN.

"TS" is defined as "technical specifications," which are mobile communications specifications called-for by the 3GPP ($3^{rd}$ generation partnership project) for implementing an LTE system.

Other acronyms that may appear herein are used and defined according to the technical specifications of the 3GPP standards.

In one embodiment, the present disclosure relates to setting establishment causes (ECs) in the context of a CS fallback procedure in EPS-enabled devices. As a non-limiting aid in understanding the present disclosure, an EC, or "establishment cause," refers to data that informs intervening protocol layers, as well as devices and software in a radio access network (RAN) an/or a core network (CN), as to the "cause" or "reason" why a communication is to be established. The "reason" for the communication can be used to manage new and established communications, and to assign communication resources to individual communications according to desired priorities. Thus, for example, if a particular communication has an establishment cause (EC) of "emergency call," then the devices and software in the EPS can give highest priority to that call, possibly excluding other pending or existing communications in favor of the emergency call. Other non-limiting examples of ECs in an EPS include "high priority access," "MT access," MO signaling," "MO data," and possibly others.

An EC is helpful to the efficiency of a mobile communication system because an EC prevents many intervening protocol stack layers within individual devices, as well as additional protocol stack layers in intervening RAN devices, from having to decode a data block to discover the reason for a communication. Instead, the EC may inform one or more intervening protocol stack layers, within a device initiating a communication but more importantly in RAN devices and CN devices, as to the reason for the communication without the intervening protocol stack layers having to decode a data block. Because a data block is decoded less frequently as it negotiates the protocol stack layers of various devices in the EPS, the transfer of the data block can occur more quickly and efficiently. Decoding a data block less frequently also lessens the costs of implementing those devices.

With this understanding of ECs, an understanding of a CS fallback procedure may also be helpful to understanding the present disclosure. As described above, a CS fallback procedure is a procedure in which, when implementing a communication, an evolved packet system (EPS) enabled device "falls back" to a circuit switched (CS) communication procedure. The "CS fallback" procedure is often used when an EPS-enabled device attempts to establish voice communication over a traditional mobile CS network, as opposed to data communication.

The details of how a CS communication procedure operates in mobile communication systems prior to LTE/EPS—such as UMTS—are known, and other than as described herein, are not necessary to an understanding of the present disclosure. However, it should be understood that both CS communication procedures and EPS communication procedures use ECs. It should also be understood that the ECs for CS communications in UMTS are entirely different from the ECs of EPS communications. In UMTS, communications call can have one of many ECs (over two dozen). EPS communications call for five ECs, leaving three spare ECs for later definition and use—for a total of eight possible ECs. For future communication procedures, a similar problem may arise in that different numbers or different types of ECs may exist that cannot be readily mapped to ECs defined for older communication procedures. Thus, the embodiments described herein are not necessarily limited to specifying ECs for CS fallback procedures in EPS systems, to the eight currently available ECs, or to other ECs that may be available. Further, the available ECs in UMTS are not all for CS communications; rather, these ECs are for all types of communications in UMTS, of which CS communications are one technique.

For reasons described further below, the ECs for CS communications cannot be simply mapped to the ECs for EPS communications. Thus, previously, when a UA desired to implement a communication using a CS procedure, no mechanism existed for the EPS-enabled device to set the proper CS fallback-defined EC. The present disclosure is directed to this issue and resolves this problem in some embodiments.

In particular, the present disclosure provides for three or more solutions or techniques for resolving this issue. In a first embodiment, a strict mapping is provided between a CS fallback procedure and an EPS EC. In a second embodiment, a service type of the EXTENDED SERVICE REQUEST message transmitted by an EPS-enabled device has a value that sets the appropriate CS EC. In a third embodiment, one of the three spare ECs in the EPS communication procedure is used to set the EPS EC. Other embodiments and variations exist, as described below and as appreciated by those in the art.

Figure 1:
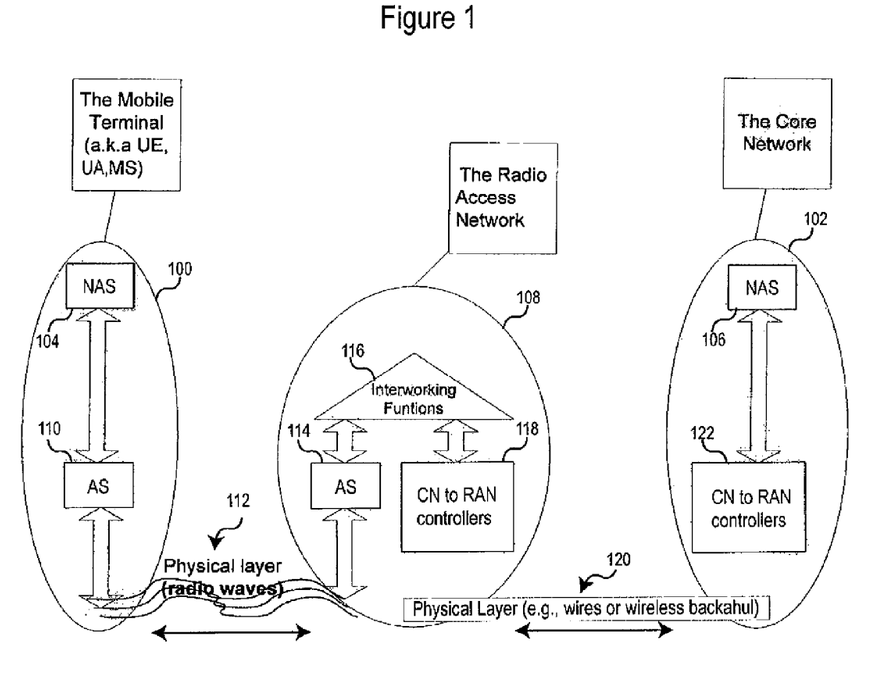
FIG. 1 is a block diagram illustrating how a UA communicates with a core network via a radio access network, according to an embodiment of the disclosure.
Figure 2:
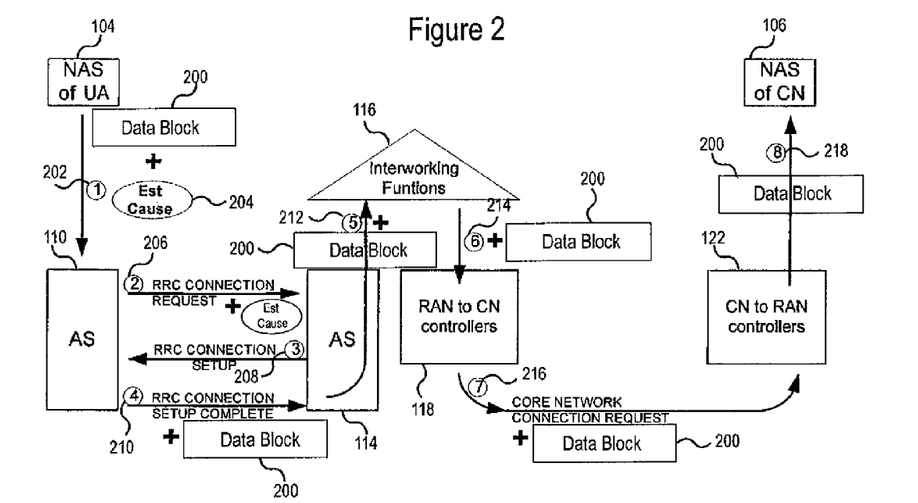
FIG. 2 is a block diagram illustrating a path taken by a data block from a UA to a core network, according to an embodiment of the disclosure.
Figure 3:
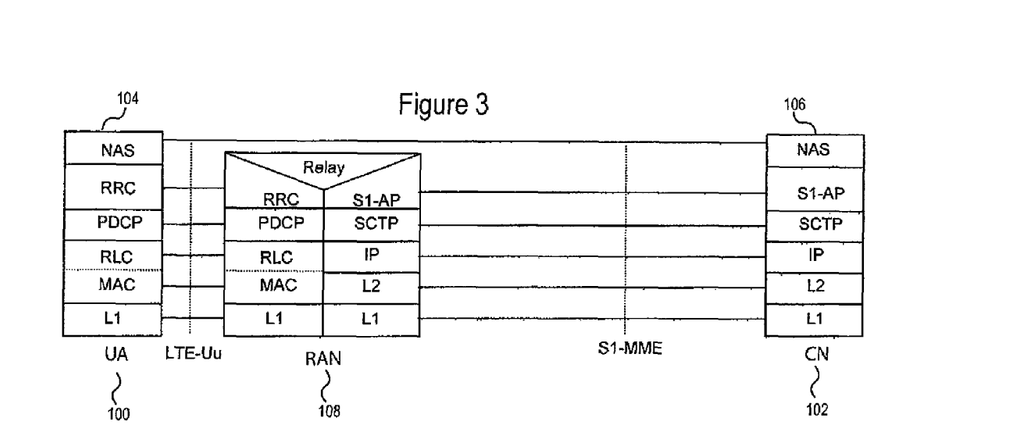
FIG. 3 is a block diagram of a control plane between a user agent, radio access network, and core network, according to an embodiment of the disclosure.
Figure 4:
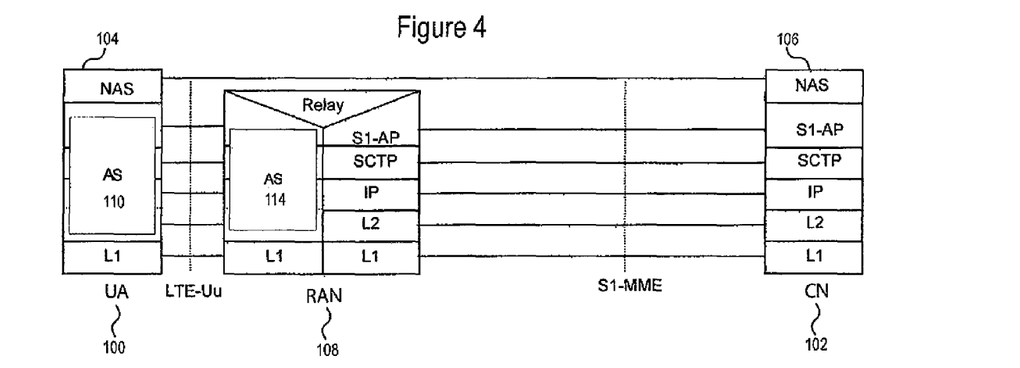
FIG. 4 is a block diagram of a control plane between a user agent, radio access network, and core network, according to an embodiment of the disclosure.

FIGS. 1 and 2 describe an exemplary procedure of how a UA establishes communication with a CN in an EPS. FIGS. 3 and 4 describe exemplary details of the protocol stacks in a UA, a RAN device, and a CN device. Generally, FIGS. 1-4 provide a context for understanding ECs in an EPS, and the issue of defining ECs in the context of a CS fallback procedure in an EPS-enabled device. FIGS. 5-8 describe exemplary solutions to the issues described with respect to FIGS. 1-4, though exemplary solutions to these issues are also understood within the context of FIGS. 1-4.

Turning now to FIGS. 1 and 2, FIG. 1 is a block diagram illustrating a UA communicating with a core network via a radio access network, according to an embodiment of the disclosure. Similarly, FIG. 2 is a block diagram illustrating a path taken by a data block from a UA to a core network, according to an embodiment of the disclosure. FIGS. 1 and 2 have similar components that have similar functions; thus, FIGS. 1 and 2 share similar reference numerals and are described together.

In an illustrative embodiment, a UA 100 attempts to establish a connection with a CN 102. Such an attempt can be referred to as a mobile originating call, or MO, because the UA initiates the connection attempt. However, the following processes can also apply to a mobile terminating (MT) call, wherein the CN 102 initiates the connection attempt.

To initiate the connection attempt, the UA NAS 104 sends a request message, e.g., a SERVICE REQUEST or EXTENDED SERVICE REQUEST, to the CN NAS 106 via a radio access network (RAN) 108. The UA NAS 104 initiates the request and, within the UA 100, transmits the request to the UA access stratum (AS) 110. In turn, the AS 110 transmits the request over a physical layer, such as radio waves as shown by arrow 112, to the RAN 108.

The RAN AS 114 receives the request, and allocates preliminary resources to the UA 100 and then communicates the request to interworking functions 116 of the RAN 108. Interworking functions may include managing the request relative to other requests, as well as other functions. Interworking functions 116 also communicate with CN to RAN controllers 118, which control communications between the RAN 108 and the CN 102. The actual communication of the request between the RAN 108 and the CN 102 is transmitted along a physical layer, which may be wires or cables, for example, as shown by arrow 120. The physical layer 120 can also be implemented as a wireless backhaul.

Within the CN 102, CN to RAN controllers 122 receive the request and transmit the request to the CN NAS 106. The CN NAS 106 then decodes the data within the request, and takes an appropriate action to allocate additional or necessary mobile resources to the UA 100 for that wireless communication. The CN NAS 106 transmits such information to the UA 100 via the RAN 108 in a manner similar to the process described above, but in the other direction.

In another embodiment, the CN initiates a MT (mobile terminating) call. The process described above occurs from CN NAS 106 to UA NAS 104 in a process similar to that described above.

FIG. 2 shows the same process in more detail in order to describe the use of an EC in an EPS communication in accordance with one embodiment. Again, in an embodiment, the UA NAS 104 initiates a communication to CN NAS 106.

EC 204 is data that informs intervening protocol layers, as well as devices and software in RAN 108 and CN 102, as to the "cause" or "reason" why a communication is to be established. EC 204 allows such intervening protocol layers to know the reason for the transmission of data block 200 without having to decode or open data block 200.

At number 1 202, UA NAS 104 transmits a data block 200 with EC 204 to UA AS 110, with the ultimate intended destination of data block 200 being CN NAS 106. UA AS 110 then begins the work of transmitting the data block 200. Again, UA AS 110 does not decode data block 200, but rather uses EC 204 to know the reason for transmission of data block 200.

At number 2 206, the UA AS 110 transmits a RRC CONNECTION REQUEST and EC 204 to RAN AS 114. RAN AS 114 responds with a RRC CONNECTION SETUP command. Knowing the EC 20, RAN AS 114 allocates initial preliminary resources to the UA 100, as shown at number 3 208. If successful, the UA AS 110 responds with a RRC CONNECTION SETUP COMPLETE signal, together with data block 200, as shown at number 4 210. As a result, data block 200 is transmitted from UA AS 110 to RAN AS 114.

At number 5 212 the RAN AS 114 transmits data block 200 and the EC 204 to interworking functions 116 of the RAN 108. The interworking functions 116 prioritize processing of data block 200, as well as perform other functions. At this point, further transmission of the EC is optional. Additionally, the EC may not have been transmitted after execution of number 3.

When processing is complete, the interworking functions 116 transmits data block 200, and may also optionally provide EC 204 to CN to RAN controllers 118, as shown at number 6 214. In turn, as shown at number 7 216, the CN to RAN controllers 118 transmit data block 200, optionally with the EC 204 if available from number 6 214, and a CONNECTION REQUEST to the CN to RAN controllers 122 of the core network. The CN to RAN controllers 122 then transmits the data block 200 and optionally the EC if available from number 7 216 to the CN NAS 106, as shown at number 8 218.

Throughout 202, 206, 208, 210, 212, 214, 216 and 218, none of the intervening devices and software of the protocol layers between UA AS 110 and CN to RAN controllers 122 have decoded data block 200 to either determine the contents of data block 200 or to determine a cause for the communication of data block 200. However, some or all of these intervening protocol stack layers in one or more of UA 100, RAN 108, and CN 102 have used EC 204 to aid in determining the priority and processing to apply to data block 200. However, at the final stage, the CN NAS 106 decodes the data block 200 and processes the data contained therein.

In an embodiment, the CN NAS 106 decodes the data block 200 and finds that data block 200 comprises a SERVICE REQUEST or an EXTENDED SERVICE REQUEST. These requests indicate to the CN NAS 106 that UA 100 desires mobile communication resources to establish communication with some other device via the CN 102.

After processing the data in data block 200, the CN NAS 106 determines an appropriate response, such as to allocate the mobile communication resources to UA 100. The CN NAS 106 then transmits data regarding such resources back to the UA 100 using a process similar to that described above, except in the opposite direction.

Otherwise stated, UA NAS 104 is communicating a SERVICE REQUEST or an EXTENDED SERVICE REQUEST to CN NAS 106. The signaling and protocol controllers that allow this communication are implemented as layers of protocol. For each layer, peer-to-peer entities signal and communicate with each other to enable and realize functions so that service can be provided. These concepts are explained in more detail in FIGS. 3 and 4.

FIG. 3 is a block diagram of a control plane between a user agent, radio access network, and core network, according to an embodiment of the disclosure. Similarly, FIG. 4 is a block diagram of a control plane between a user agent, radio access network, and core network, according to an embodiment of the disclosure. FIGS. 3 and 4 have similar components that have similar functions; thus, FIGS. 3 and 4 share similar reference numerals and are described together. FIGS. 3 and 4 show additional detail in the relationship amongst the protocol stack layers among UA 100, RAN 108, and CN 102. The description of communication of data from UA 100 to CN 102 and back again is provided with regard to FIGS. 1 and 2, which also applies to FIGS. 3 and 4.

As described above, one or more of the network layer signaling and protocol controllers of the UA AS 110, RAN 108, and CN NAS 106 may communicate with one another through communications links established by the underlying RAN controllers. In UMTS and 3GPP terminologies, the network layer between the UA 100 and the CN 102 is termed the non-access stratum (NAS). UA 100 has UA NAS 104 and CN 102 has CN NAS 106; however, RAN 108 may not have a NAS in the embodiments described herein.

The radio access layers in the UA 100 and RAN 108 are termed the access stratum (AS). UA AS 110 includes several protocol layers in UA 100, and RAN AS 114 includes several protocol layers in RAN 108, as shown in FIG. 4.

In each protocol stack, an underlying layer provides services to the layer above. Thus, for example, the UA AS 110 of UA 100 provides services to the UA NAS 104. One of the services provided by UA AS 110 is to establish a signaling connection for the UA NAS 104 of the UA 100. The signaling connection allows the UA NAS 104 to communicate with the CN NAS 106. In LTE/SAE (system architecture evolution)/EPS networks, the CN NAS 106 can be referred to as the enhanced packet core (EPC). The process of establishing a signaling connection is described with respect to FIGS. 1 and 2. More details regarding the signaling connection can be found in 3GPP TS 36.331 and in 3GPP TS 25.331.

As part of the establishment of the signaling connection, the RRC of the UA 100 provides to the RAN AS 114 an indication of the reason for requesting the connection. This EC is built into the RRC signaling protocol, as further described in 3GPP TS 36.331.

As also described above with respect to FIGS. 1 and 2, the EC serves the purpose of indicating to the destination nodes, such as the eNBJE-UTRAN and perhaps even for the EPC, the reason for the establishment of the signaling connection. Thus, these devices and software can allocate appropriate resources for the signaling connection, and subsequent usage of the signaling connection. The EC can also be used to discriminate or determine how much to charge a user of UA 100 for use of the mobile communication service.

In UMTS, and now in EPS, the EC that the RRC provides to the network in an RRC CONNECTION REQUEST MESSAGE is taken from the inter-layer request from the UA NAS 104. See, for example, the RRC CONNECTION REQUEST field descriptions in 3GPP TS 36.331.

In UMTS, the ECs can take one of many values. The possible values for ECs in UMTS are given in 3GPP TS 25.331. Currently, more than 20 possible values exist for ECs in UMTS.

In summary, then, the RRC EC that the UA AS 110 provides in the RRC CONNECTION REQUEST comes from UA NAS 104. The UA NAS 104 also determines the EC to be used. In UMTS, the UA NAS 104 chooses the EC in accordance to the rules provided in UMTS Annex L of 3GPP TS 24.008. These rules set down the mapping of the NAS procedure to the RRC EC.

With the above description of how mobile communications operate, the following solutions and techniques provided by the present disclosure can now be properly understood. In EPS, the equivalent list of ECs for UMTS (described in 3GPP TS 36.331) is not available. Instead, in EPS, there have been established five set ECs and three spare ECs. The five set ECs are "emergency call," "high priority access," "mobile terminating (MT) access," "mobile originating (MO) signaling," and "MO data." Spare ECs have not been defined, but have been reserved for later definition.

Thus, in EPS, when the UA NAS 104 attempts to establish an RRC connection, the UA NAS 104 will set one of the five ECs described above. This procedure may be used in most if not all EPS communications.

However, for some types of communications, particular voice calls, use of the conventional UMTS system may be desirable. Thus, a procedure has been implemented wherein an EPS-enabled device can use the conventional UMTS procedures, devices, and software. This procedure is known as a "CS fallback," which stands for "circuit-switched fallback."

The EPS-enabled device is programmed to use the EPS ECs when transmitting data over an EPS network, and the EPS network expects to see EPS ECs. However, EPS ECs have to be used when the EPS-enabled device, while in EPS, wishes to initiate a CS fallback service that will lead to using the UMTS procedures. EPCs should be used in this circumstance because the UA NAS 104 initiates such a CS fallback in the EPS.

At first glance it may appear that one could inherit the UMTS ECs from 3GPP TS 24.008 into the EPS NAS specification. However, EPS NAS procedures have changed, and improved functionalities have been implemented such that the conventional UMTS mapping cannot apply. Furthermore, the RRC ECs indicated for the EPS are quite different from those used in UMTS; thus, again, a copy over of the UMTS ECs, or one-to-one mapping, is not possible. Still further, very few ECs are used in the EPS, relative to the UMTS systems. Yet further, some EPS NAS procedures realized by the new NAS messages do not exist in UMTS. For example, the NAS in the EPS uses either a SERVICE REQUEST message or an EXTENDED SERVICE REQUEST message, but the EXTENDED SERVICE REQUEST is not used in UMTS.

The issue of mapping EPS-related ECs to UMTS-related ECs has been addressed, partially only, with regard to a general mapping of NAS procedures to an EPS RRC EC. See, for example, document C1-083834 promulgated by CT1, which is hereby incorporated by reference. However, this proposed solution does not address all of the issues described above. In particular, this proposed solution does not work in the case of a CS fallback communication because, in EPS systems, the service request procedure is also used to realize CS fallback communications. Additionally, through a CS fallback procedure, the UA can initiate an emergency call in the CS domain. Still further, the existence in EPS of the EXTENDED SERVICE REQUEST message as a signaling message of the service request procedure is not accounted-for in existing documentation, such as C1-083834. The following figures and description provide solutions and techniques in this regard.

Figure 5:
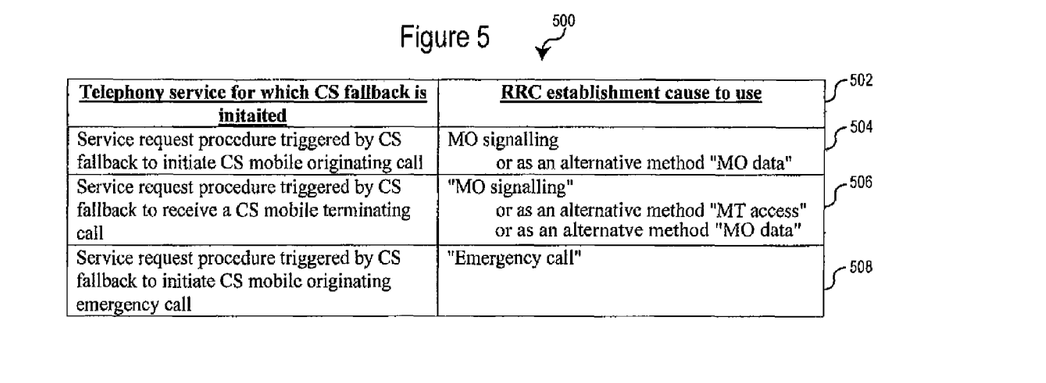
FIG. 5 is a table illustrating a strict mapping between a CS fallback invoked telephony service and an EPS RRC establishment cause, according to an embodiment of the disclosure.

FIG. 5 is a table illustrating a strict mapping between a CS fallback invoked telephony service and an EPS RRC establishment cause, according to an embodiment of the disclosure. Table 500 illustrates one embodiment of addressing the limitations described with respect to FIGS. 1-4.

The embodiments described in FIG. 5 provide for a strict mapping between the CS fallback invoked telephony service, such as an MO call, a MT call, or an emergency call, to an EPS RRC EC. This strict mapping can be, for example, in the form provided in FIG. 5, though other mappings could be used.

Row 502 shows the titles for the columns, including "Telephony service for which CS fallback is initiated" and "RRC establishment cause to use." Rows 504, 506, and 508 show the mappings to be used by row. Thus, as shown in row 504, for a service request procedure triggered by CS fallback to initiate a CS MO call, the EPS EC "MO signaling" can be used. Alternatively, the EPS EC "MO data" can be used. As shown in row 506, for a service request procedure triggered by CS fallback to receive a CS MT call, the EPS EC "MO signaling" can be used. Alternatively, the EPS EC "MT access" can be used. In yet another embodiment, the EPS EC "MO data" can be used. As shown in row 508, for a service request procedure triggered by CS fallback to initiate a CS MO emergency call, the EPS EC "emergency call" can be used.

In an embodiment, a processor can be configured to set an establishment cause (EC) to "MO signaling" if a SERVICE REQUEST requests resources for UL (uplink) signaling. In another embodiment, a processor can be configured to set an establishment cause to "MO data" if a SERVICE REQUEST requests user plane radio resources. In yet another embodiment, a processor configured can be configured to set an establishment cause to "MT access" if a CN domain indicator is set to PS (packet switched).

Figure 6:
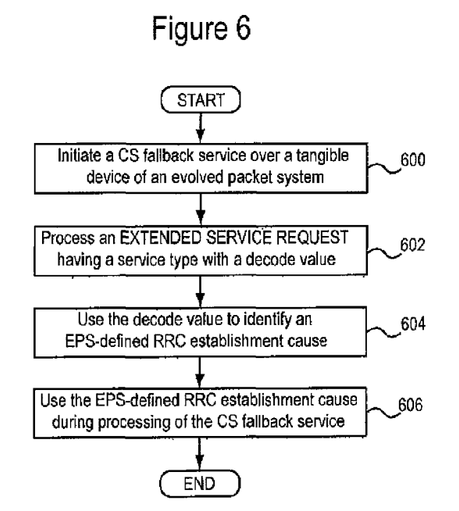
FIG. 6 is a flow chart illustrating a process of determining an RRC establishment cause of an EPS NAS procedure during a CS fallback communication, according to an embodiment of the disclosure.

FIG. 6 is a flow chart illustrating a process of determining an RRC establishment cause of an EPS NAS procedure during a CS fallback communication, according to an embodiment of the disclosure. The process shown in FIG. 6 is another technique provided to address the issues described with respect to FIGS. 1-4. The process shown in FIG. 6 may be implemented entirely in a UA, but may be initiated in a UA and then additionally processed in part in a RAN. In additional optional embodiments, the process shown in FIG. 6 may be implemented entirely in a CN, but may be initiated in a CN and then additionally processed in part in a RAN. In still further optional embodiments, the process shown in FIG. 6 can be initiated in a RAN and then processed in either the UA or CN, though in this case the RAN device should have an NAS layer or some other functionality for generating the EC.

Specifically, FIG. 6 takes advantage of the EXTENDED SERVICE REQUEST message used in EPS communications. FIG. 6 specifically discloses using an information element associated with the EXTENDED SERVICE REQUEST, known as a "service type." The service type can be provided with one or more decode values that reflect a cause for the EXTENDED SERVICE REQUEST that is being attempted. Thus, in this embodiment, the decode value or values of the service type used in the EXTENDED SERVICE REQUEST is used to provide the mapping to which the RRC EC is to be used.

In an embodiment, the process begins with a processor initiating a circuit switched (CS) fallback service over a tangible device of an evolved packet system (EPS) (block 600). The tangible device may be a UA, or optionally or a CN. In the case of a UA or CN, the tangible device further comprises a protocol layer having a non-access stratum (NAS).

After initiating the CS fallback service, NAS processes an EXTENDED SERVICE REQUEST having a service type with a decode value (block 602). The decode value can be used to identify an EPS-defined radio resource control (RRC) establishment cause (EC) (block 604). For whichever of the UA or the CN that initiated the communication, the various devices and protocol layers within the EPS system then use the EPS-defined RRC EC during processing of the CS fallback service (block 606). The process terminates thereafter.

The process described in FIG. 6 can also be expanded. For example, in an embodiment the NAS can generate the EXTENDED SERVICE REQUEST. In this case, the NAS of the UA determines the decode value and causes the EXTENDED SERVICE REQUEST to be transmitted to realize the CS fallback service. In contrast, the NAS of the UA could receive the EXTENDED SERVICE REQUEST. In this case, an access stratum (AS) of the tangible device processes the decode value.

A number of specific examples of service types and corresponding RRC ECs are provided herein. In a first example, the service type comprises "mobile originating (MO) CS fallback." In this case, the RRC EC comprises one of "MO signaling" or MO data." In a second example, the service type comprises "mobile terminating (MT) CS fallback." In this case, the RRC EC comprises one of "MT access" or "mobile originating (MO) signaling" or "MO data". In a third example, the service type comprises "mobile originating (MO) CS fallback emergency call." In this case, the RRC EC comprises "emergency call."

In one embodiment, messages other than the EXTENDED SERVICE REQUEST message may have a service type information element. This service type information element may indicate a type of service requested. Thus, an EC may be determined based upon the service type in associated with messages other than the EXTENDED SERVICE REQUEST message. For example, a future system may have a video network-socializing service. A message may be sent to request the video network-socializing service. The EC based on service type may be associated with the request message and may indicate that video service is needed.

Figure 7:
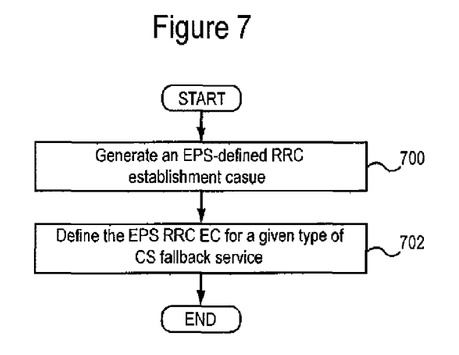
FIG. 7 is a flow chart illustrating a process of determining an RRC establishment cause of an EPS NAS procedure during a CS fallback communication, according to an embodiment of the disclosure.

FIG. 7 is a flow chart illustrating a process of determining an RRC establishment cause of an EPS NAS procedure during a CS fallback communication, according to an embodiment of the disclosure. The process shown in FIG. 7 is yet another way for addressing the issues described with respect to FIGS. 1-4. The process shown in FIG. 7 can be implemented in a tangible device enabled for a circuit switched (CS) fallback service in an evolved packet system (EPS). The tangible device may be a UA, or optionally a CN. In the case of a UA or CN, the tangible device further includes a protocol layer having a non-access stratum (NAS).

The process begins as the NAS generates an EPS-defined radio resource control (RRC) establishment cause (EC) (block 700). The NAS defines the EPS RRC EC for a given type of CS fallback service (block 702). The process terminates thereafter.

In an embodiment, all possible EPS-defined RRC ECs include five defined RRC ECs and three spare RRC ECs. In this case, the RRC EC defined for the given type of CS fallback service replaces one of the three spare RRC ECs. In an embodiment, the replaced RRC EC can be "CS fallback services." In another embodiment, the replaced RRC EC can be "CS emergency call." In yet another embodiment, two of the three spare RRC ECs can be replaced, a first one being "CS fallback services," and a second being "CS emergency call." In different embodiments, different names for these formerly spare RRC ECs can be used while the functions of the formerly spare RRC ECs remain substantially the same. The functions include indicating that the RRC connection request is for CS fallback services, or, if appropriate or desired, a CS emergency call.

Figure 8:
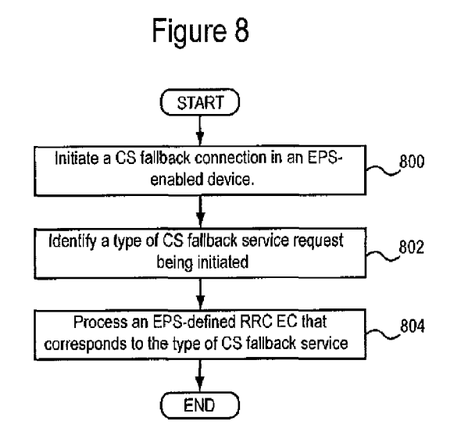
FIG. 8 is a flow chart illustrating a process of determining an RRC establishment cause of an EPS NAS procedure during communication to realize a CS fallback service, according to an embodiment of the disclosure.

FIG. 8 is a flow chart illustrating a process of determining an RRC establishment cause of an EPS NAS procedure during communication to realize a CS fallback service, according to an embodiment of the disclosure. The process shown in FIG. 8 is yet another technique for resolving the issues described with respect to FIGS. 1-4. The process shown in FIG. 8 corresponds to the solution described with respect to FIG. 5.

The process begins as a circuit switched (CS) fallback service is initiated in an evolved packet system (EPS)-enabled device (block 800). The EPS-enabled device includes a protocol layer having a non-access stratum (NAS). The EPS-enabled device then identifies a type of CS fallback service request being initiated (block 802). The NAS of the EPS-enabled device then processes an EPS-defined radio resource control (RRC) establishment cause (EC) that corresponds to the type of CS fallback service (block 804). The term "corresponds to" means that a particular type CS fallback service has a corresponding particular RRC EC. The process terminates thereafter. This process can be performed during either one of generating the RRC EC or receiving the RRC EC.

The mapping of types of CS fallback service requests to EPS-defined RRC ECs can take different forms. In a first example, when the type of CS fallback service request comprises a CS mobile originating (MO) call, the corresponding RRC EC may be one of "MO signaling" or "MO data." In a second example, when the type of CS fallback service request comprises a CS mobile terminating (MT) call, the corresponding RRC EC may be one of "mobile originating signaling" or "MO data" or "MT access." In a third example, when the type of CS fallback service request comprises a mobile originating emergency call, the corresponding RRC EC may be an "emergency call".

Figure 9:
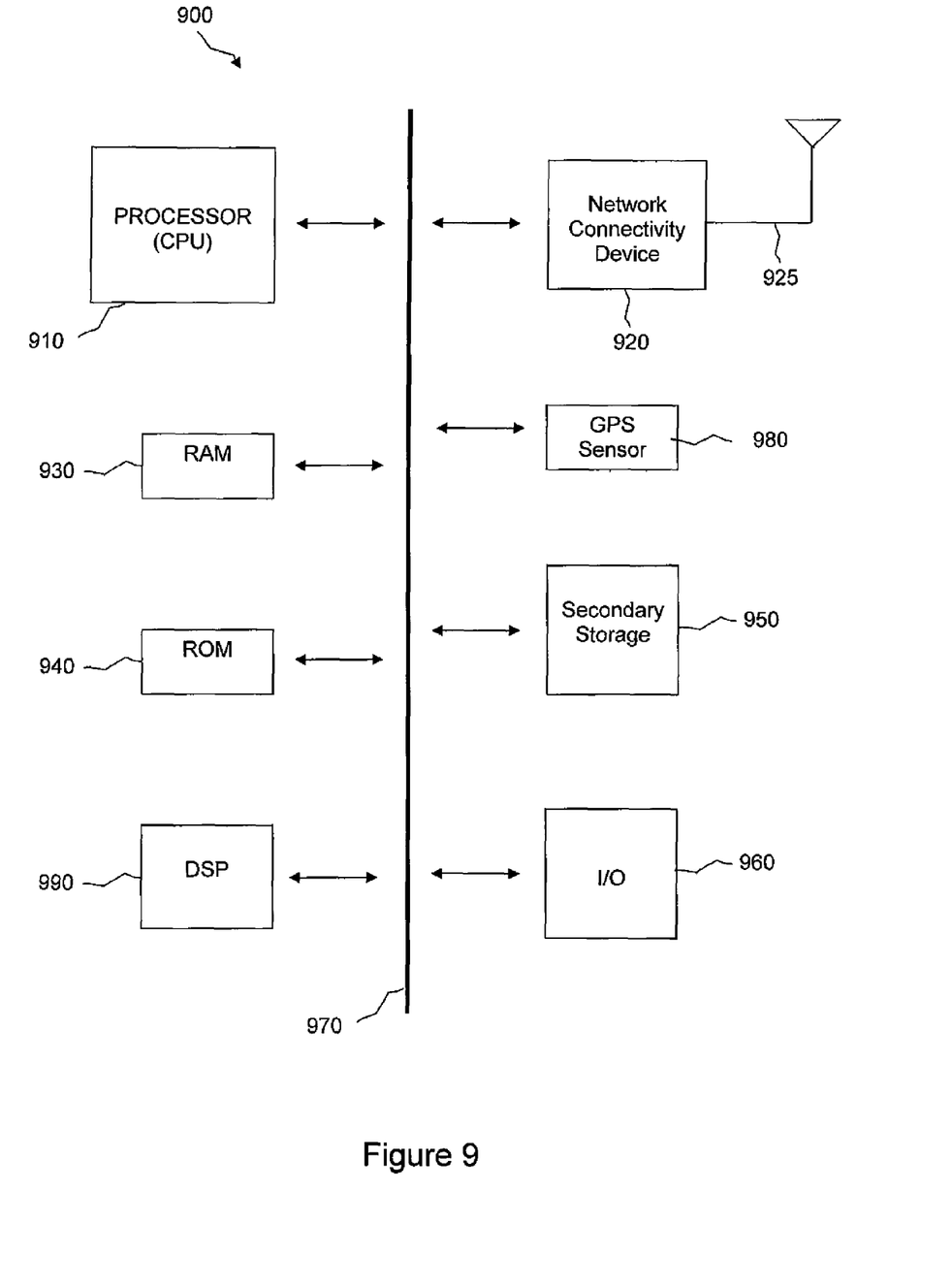
FIG. 9 illustrates a processor and related components suitable for implementing the several embodiments of the present disclosure.

The UA and other components described above might include a processing component that is capable of executing instructions related to the actions described above. FIG. 9 illustrates an example of a system 900 that includes a processing component 910 suitable for implementing one or more embodiments disclosed herein. In addition to the processor 910 (which may be referred to as a central processor unit or CPU), the system 900 might include network connectivity devices 920, random access memory (RAM) 930, read only memory (ROM) 940, secondary storage 950, and input/output (I/O) devices 960. These components might communicate with one another via a bus 970. In some cases, some of these components may not be present or may be combined in various combinations with one another or with other components not shown. These components might be located in a single physical entity or in more than one physical entity. Any actions described herein as being taken by the processor 910 might be taken by the processor 910 alone or by the processor 910 in conjunction with one or more components shown or not shown in the drawing, such as a digital signal processor (DSP) 902. Although the DSP 902 is shown as a separate component, the DSP 902 might be incorporated into the processor 910.

The processor 910 executes instructions, codes, computer programs, or scripts that it might access from the network connectivity devices 920, RAM 930, ROM 940, or secondary storage 950 (which might include various disk-based systems such as hard disk, floppy disk, or optical disk). While only one CPU 910 is shown, multiple processors may be present. Thus, while instructions may be discussed as being executed by a processor, the instructions may be executed simultaneously, serially, or otherwise by one or multiple processors. The processor 910 may be implemented as one or more CPU chips.

The network connectivity devices 920 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 920 may enable the processor 910 to communicate with the Internet or one or more telecommunications networks or other networks from which the processor 910 might receive information or to which the processor 910 might output information. The network connectivity devices 920 might also include one or more transceiver components 925 capable of transmitting and/or receiving data wirelessly.

The RAM 930 might be used to store volatile data and perhaps to store instructions that are executed by the processor 910. The ROM 940 is a non-volatile memory device that typically has a smaller memory capacity than the memory capacity of the secondary storage 950. ROM 940 might be used to store instructions and perhaps data that are read during execution of the instructions. Access to both RAM 930 and ROM 940 is typically faster than to secondary storage 950. The secondary storage 950 is typically comprised of one or more disk drives or tape drives and might be used for non-volatile storage of data or as an over-flow data storage device if RAM 930 is not large enough to hold all working data. Secondary storage 950 may be used to store programs that are loaded into RAM 930 when such programs are selected for execution.

The I/O devices 960 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 925 might be considered to be a component of the I/O devices 960 instead of or in addition to being a component of the network connectivity devices 920.

The following are incorporated herein by reference for all purposes: 3rd Generation Partnership Project (3GPP) Technical Specification (TS) 24.008, 25.331, 24.301, 23.272, 36.331, 36.813 and 3GPP TS 36.814, as well as appendices, A and B which accompany this specification and are considered part of this specification.

Thus, the embodiments provide for a user agent, core network device, and method for indicating a circuit switched (CS) fallback service in an evolved packet system (EPS). In the case of a UA, the UA further comprises a protocol layer having a non-access stratum (NAS). A processor of the UA device is further configured to promote the NAS to process an EXTENDED SERVICE REQUEST having a service type with a decode value. The decode value identifies an EPS-defined radio resource control (RRC) establishment cause (EC). In alternate embodiments, a similar process can be implemented in a CN, and possibly in a RAN.

The embodiments also provide for a user agent, core network device, and method for indicating a circuit switched (CS) fallback service in an evolved packet system (EPS). In the case of a UA, the UA includes a protocol layer having a non-access stratum (NAS). A processor of the UA is configured to promote the NAS to generate an EPS-defined radio resource control (RRC) establishment cause (EC). The RRC EC is defined by the NAS for a given type of CS fallback service. In alternate embodiments, a similar process can be implemented in a CN, and possibly in a RAN.

The embodiments also provide for a user agent, core network device, and method for indicating a circuit switched (CS) fallback service in an evolved packet system (EPS). In the case of a UA, the UA device includes a protocol layer having a non-access stratum (NAS). A processor of the UA is configured to identify a type of service request for which the CS fallback service is initiated. The processor is further configured to cause the NAS to process an EPS-defined radio resource control (RRC) establishment cause (EC) that is associated with the type. In alternate embodiments, a similar process can be implemented in a CN, and possibly in a RAN.

The embodiments still provide for a UA that includes a processor configured to set an establishment cause (EC) based upon a service type. The processor can be further configured to set the establishment cause to "MO data" if the service type is set to "mobile originating CS fallback". The processor can be further configured to set the establishment cause to "MT access" if the service type is set to "mobile terminating CS fallback". The processor can be further configured to set the establishment cause to "emergency call" if the service type is set to "mobile originating CS fallback emergency call".

The embodiments yet provide for a processor that can be configured to set an establishment cause (EC) to "MO signaling" if a SERVICE REQUEST requests resources for UL signaling. In another embodiment, a processor can be configured to set an establishment cause to "MO data" if a SERVICE REQUEST requests user plane radio resources. In yet another embodiment, a processor configured can be configured to set an establishment cause to "MT access" if a CN domain indicator is set to PS (packet switched).

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A user agent equipment for operation in an evolved packet system (EPS), the user agent equipment comprising:
a non-access stratum (NAS) protocol layer configured to generate a NAS service request message comprising an EXTENDED SERVICE REQUEST and identifying a service type related to circuit-switched (CS) fallback; and
an access stratum (AS) protocol layer configured to set a radio resource control (RRC) establishment cause (EC) of an RRC CONNECTION REQUEST message, the EC based upon the service type related to CS fallback identified by the NAS service request message, wherein when the service type is "mobile originating (MO) CS fallback", the RRC EC is set to "MO data".

2. The user agent equipment of claim 1 wherein when the service type is "mobile terminating (MT) CS fallback", the RRC EC is set to "MT access", "mobile originating (MO) signaling", or "MO data".

3. The user agent equipment of claim 1 wherein when the service type is "mobile originating (MO) CS fallback emergency call", the RRC EC is set to "emergency call".

4. The user agent equipment of claim 1, wherein the RRC EC corresponds to a given type of CS fallback service.

5. The user agent equipment of claim 1, wherein upon the user agent equipment initiating a circuit switched (CS) fallback service, the NAS protocol layer is configured to identify a type of CS fallback service being initiated and determine the RRC EC based upon the type of CS fallback being initiated.

6. The user agent equipment of claim 1, wherein the NAS protocol layer is further configured to determine the RRC EC based upon the service type, and provide the RRC EC to the AS protocol layer.

7. The user agent equipment of claim 6, wherein the RRC EC based upon the service type is determined in accordance with a mapping of NAS procedures to RRC ECs.

8. The user agent equipment of claim 1, wherein the NAS service request message is an EXTENDED SERVICE REQUEST message.

9. A method in an evolved packet system (EPS), comprising:
generating, in a non-access stratum (NAS) protocol layer, a NAS service request message comprising an EXTENDED SERVICE REQUEST and identifying a service type related to circuit-switched (CS) fallback; and
setting, in an access stratum (AS) protocol layer, a radio resource control (RRC) establishment cause (EC) of an RRC CONNECTION REQUEST message, the EC based upon the service type related to CS fallback identified by the NAS service request message, wherein when a service type of "mobile originating (MO) CS fallback" is generated, setting the RRC EC to "MO data".

10. The method of claim 9, wherein when a service type of "mobile terminating (MT) CS fallback" is generated, setting the RRC EC to "MT access", "mobile originating (MO) signaling", or "MO data".

11. The method of claim 9, wherein when a service type of "mobile originating (MO) CS fallback emergency call" is generated, setting the RRC EC to "emergency call."

12. The method of claim 9, wherein the RRC EC corresponds to a given type of CS fallback service.

13. The method of claim 9, wherein:
upon initiation of a circuit switched (CS) fallback service, identifying, in the NAS protocol layer, a type of CS fallback service being initiated and determining the RRC EC based upon the type of CS fallback being initiated.

14. The method of claim 9, further comprising determining, at the NAS protocol layer, the RRC EC based upon the service type and providing the RRC EC to the AS protocol layer.

15. The method of claim 14, wherein determining the RRC EC is based upon the service type in accordance with a mapping of NAS procedures to RRC ECs.

16. The method of claim 9, wherein generating the NAS service request message comprises generating an EXTENDED SERVICE REQUEST message.

17. A non-transitory computer readable medium, encoded with instructions that, when executed by a processor in an evolved packet system (EPS), perform a method comprising:

generating, in a non-access stratum (NAS) protocol layer, a NAS service request message comprising an EXTENDED SERVICE REQUEST and identifying a service type related to circuit-switched (CS) fallback; and setting, in an access stratum (AS) protocol layer, a radio resource control (RRC) establishment cause (EC) of an RRC CONNECTION REQUEST message, the EC based upon the service type related to CS fallback identified by the NAS service request message, wherein when a service type of "mobile originating (MO) CS fallback" is generated, setting the RRC EC to "MO data".

18. The non-transitory computer readable medium of claim 17, wherein when a service type of "mobile terminating (MT) CS fallback" is generated, setting the RRC EC to "MT access", "mobile originating (MO) signaling", or "MO data".

19. The non-transitory computer readable medium of claim 17, wherein when a service type of "mobile originating (MO) CS fallback emergency call" is generated, setting the RRC EC to "emergency call".

20. The non-transitory computer readable medium of claim 17, wherein the RRC EC corresponds to a given type of CS fallback service.

21. The non-transitory computer readable medium of claim 17, wherein upon initiation of a circuit switched (CS) fallback service, identifying a type of CS fallback service being initiated and determining the RRC EC based upon the type of CS fallback being initiated.

22. The non-transitory computer readable medium of claim 17, the performed method further comprising determining, at the NAS protocol layer, the RRC EC based upon the service type and providing the RRC EC to the AS protocol layer.

23. The non-transitory computer readable medium of claim 22, wherein determining the RRC EC is based upon the service type in accordance with a mapping of NAS procedures to RRC ECs.

24. The non-transitory computer readable medium of claim 17, wherein generating the NAS service request message comprises generating an EXTENDED SERVICE REQUEST message.

* * * * *